(12) United States Patent
Monros Garrigosa et al.

(10) Patent No.: US 11,136,960 B2
(45) Date of Patent: Oct. 5, 2021

(54) GENERATOR TORQUE CONTROL AFTER GRID EVENT

(71) Applicant: General Electric Company, Schenectady, NY (US)

(72) Inventors: Miriam Monros Garrigosa, Barcelona (ES); Matthew Paul Richwine, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/940,825

(22) Filed: Jul. 28, 2020

(65) Prior Publication Data

US 2021/0033065 A1 Feb. 4, 2021

(30) Foreign Application Priority Data

Jul. 31, 2019 (EP) .................................... 19382664

(51) Int. Cl.
*F03D 7/02* (2006.01)
*F03D 9/25* (2016.01)
*H02P 9/10* (2006.01)
*H02P 101/15* (2016.01)

(52) U.S. Cl.
CPC ............. *F03D 7/0272* (2013.01); *F03D 9/25* (2016.05); *H02P 9/102* (2013.01); *H02P 2101/15* (2015.01)

(58) Field of Classification Search
CPC ........... F03D 7/0272; F03D 9/25; H02P 9/102
See application file for complete search history.

(56) References Cited

U.S. PATENT DOCUMENTS

| | | | |
|---|---|---|---|
| 2010/0283247 A1 | 11/2010 | Krueger | |
| 2011/0248686 A1 | 10/2011 | Thulke et al. | |
| 2012/0150524 A1 | 6/2012 | Nielsen et al. | |
| 2014/0097619 A1* | 4/2014 | Laborda Rubio | F03D 7/0296 290/44 |
| 2017/0107973 A1 | 4/2017 | Drossel et al. | |

FOREIGN PATENT DOCUMENTS

| | | |
|---|---|---|
| EP | 2486274 A2 | 8/2012 |
| WO | WO 2012/073504 A2 | 6/2012 |

OTHER PUBLICATIONS

European Search Report Corresponding to EP19382664 dated Jan. 28, 2020.

\* cited by examiner

*Primary Examiner* — Viet P Nguyen
(74) *Attorney, Agent, or Firm* — Dority & Manning, P.A.

(57) ABSTRACT

A method of operating a wind turbine comprising a generator in the event of a voltage dip is disclosed. The method comprises detecting an end of the voltage dip, determining an acceleration of a rotor of the generator, and increasing a torque of the generator when the end of the voltage dip is detected according to a selected torque profile. The selected torque profile is selected from a plurality predetermined torque profiles, wherein the predetermined torque profiles describe torque as a function of time. The selected torque profile is selected based on the determined acceleration of the rotor of the generator. Also provided are wind turbines configured for such methods.

20 Claims, 6 Drawing Sheets

GENERATOR TORQUE CONTROL AFTER GRID EVENT

The present disclosure relates to methods for operating a wind turbine generator after a grid event. More particularly, the present disclosure relates to methods of operating a generator of a wind turbine after a low voltage (LVRT) or zero voltage ride through (ZVRT). The present disclosure also relates to a generator and a wind turbine configured for methods to recover from LVRT or ZVRT.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to an electrical generator, either directly ("directly driven") or through the use of a gearbox. This way, the electrical generator produces electricity which can be supplied to the electrical grid.

The generator may be connected to the electrical grid through a power converter. Such a power converter may include a line-side converter connected to the grid, a machine-side converter connected to a rotor of the generator and a DC-link between the line-side converter and machine-side converter.

The power converter regulates the power output from the generator to the grid, and can control the torque applied to the generator stator. In normal operation of a wind turbine, the active power produced by the generator will be injected into the grid. The power that can be produced by a generator depends on the prevailing wind speed, but also depends on the torque applied to the generator stator. The control of the wind turbine will generally depend on the prevailing wind speed, and the pitch angle of the blades and torque applied to the stator will generally be chosen such as to maximize electrical power generation and electrical power injection into the grid.

Grid codes can prescribe requirements for all electrical machines connected to an electrical grid, including wind turbines. Different grid codes are in use for different grids in different countries.

Specifically, grid codes may prescribe abilities of wind turbine generators to cope with events or abnormalities on the electrical grid. One such grid event can be a voltage dip. A voltage dip (or "voltage sag") is a sudden reduction of the voltage of the electrical grid. During a voltage dip, the voltage may drop to 10%-100% below its nominal value. A voltage dip may last up to a few seconds.

Grid codes may prescribe that wind turbines connected to the grid should not disconnect from the grid and interrupt operation in such an event. Instead, grid codes may prescribe that the wind turbines connected to the grid should be able to "ride through" such a low voltage or zero voltage event. Such behavior is sometimes described as Low Voltage Ride Through (LVRT) or Zero Voltage Ride Through (ZVRT). In particular, the wind turbines may be required to rapidly reduce the power supplied to the grid. This is done by reducing the generator torque. A reduction of the generator torque will lead to a reduction in active power output. However, it will also lead to an increase in rotational speed of the generator, and can lead to torsional oscillations in drive train elements.

The drive train as used herein may be regarded as all components that operatively couple the wind turbine rotor to the generator. The drive train may include e.g. a low speed shaft, a gearbox, and a high speed shaft. The high speed shaft exiting the gearbox may be connected to a rotor shaft of the generator through an elastic or flexible coupling. The coupling may typically be designed to transmit torsional loads, but limit the transmission of bending loads.

Grid codes may also prescribe a behavior or minimum requirements for the behavior of a wind turbine after the grid event has been resolved. E.g. a grid code may require for normal power generation to be resumed as quickly as possible after the grid event has been resolved.

The present disclosure relates to methods and systems designed to be able to cope with such grid conditions and comply with grid codes.

SUMMARY

In one aspect, a method of operating a wind turbine comprising a generator in the event of a voltage dip is provided. The method comprised detecting an end of the voltage dip, determining an acceleration of a rotor of the generator, and increasing a torque of the generator when the end of the voltage dip is detected according to a selected torque profile. The selected torque profile is selected from a plurality predetermined torque profiles, wherein the predetermined torque profiles describe torque as a function of time. The selected torque is selected based on the determined acceleration of the rotor of the generator.

In accordance with this aspect, a method of operating a wind turbine for recovering power production after a voltage dip is provided that can comply with strict grid codes. Also, torque on the drive train components can be kept below a limit at which a drive train component could be damaged. Also peaks in generator Speed and electrical power may be reduced.

It has been found that the speed and timing at which active power is recovered after fault clearing significantly impacts the torque levels observed in the main shaft of the wind turbine. Managing torque levels, and peaks in generator speed and electrical power are important to the integrity and lifetime of the drivetrain components and to the ability of the wind turbine to ride through LVRT events without tripping.

By selecting a suitable torque profile, peaks in torque on the drive train can be avoided. Such peaks have been shown to damage e.g. a flexible coupling between a high speed shaft and a generator rotor shaft. And such peaks can be caused when a high torque is provided at the wrong moment.

Also, in accordance with this aspect, there is no need to wait for a specific moment to apply a torque. Recovery to power production is therefore not delayed and grid code requirements in this respect can be complied with. Certain grid codes limit the possibility of independently determining the timing at which active power is recovered, as power recovery times required can impose that generator torque starts to be recovered as soon as the LVRT o ZVRT event ends.

Finally, by providing a plurality of predetermined torque profiles, that can be linked with specific situations of the generator rotor, there is no need to determine a torque profile in response to every possible grid event.

In a further aspect, a wind turbine is provided. The wind turbine comprises a wind turbine rotor with a plurality of blades and a generator including a generator rotor and a generator stator, wherein the generator rotor is operatively coupled to the wind turbine rotor. The wind turbine further comprises a controller for controlling a torque of the generator. The controller is configured to determine an end of a voltage dip on a grid connected to the generator, to determine an acceleration of the generator rotor at the end of the voltage dip; and to apply a torque to the generator according to a predetermined torque profile selected from a plurality of torque profiles. The predetermined torque profile is selected based on the determined acceleration of the generator rotor at the end of the voltage dip.

In yet a further aspect, a method of operating a wind turbine including a generator connected to an electrical grid is provided. The method comprises determining a voltage event on the electrical grid, and reducing a torque of the generator during the voltage event. The method further comprises determining a recovery of the electrical grid after the voltage event and increasing the torque of the generator substantially to a level prior to the voltage event. The torque may be increased with a first substantially constant torque rate or with a second substantially constant torque rate, wherein the first or the second torque rate is selected based on an acceleration of a rotor of the generator at the moment of recovery.

The term "torque rate" as used throughout the present disclosure indicates the speed at which the torque is increased. The rate or "ramp" of torque may be defined as the first order time derivative of a torque profile describing torque as a function of time.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
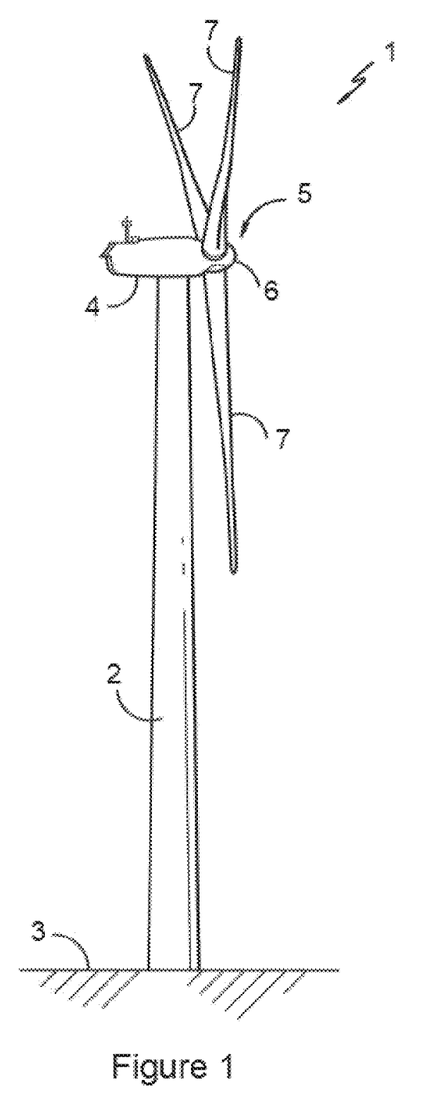
FIG. 1 illustrates a perspective view of a wind turbine according to one example of the present disclosure.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4 at a front region. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electrical generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
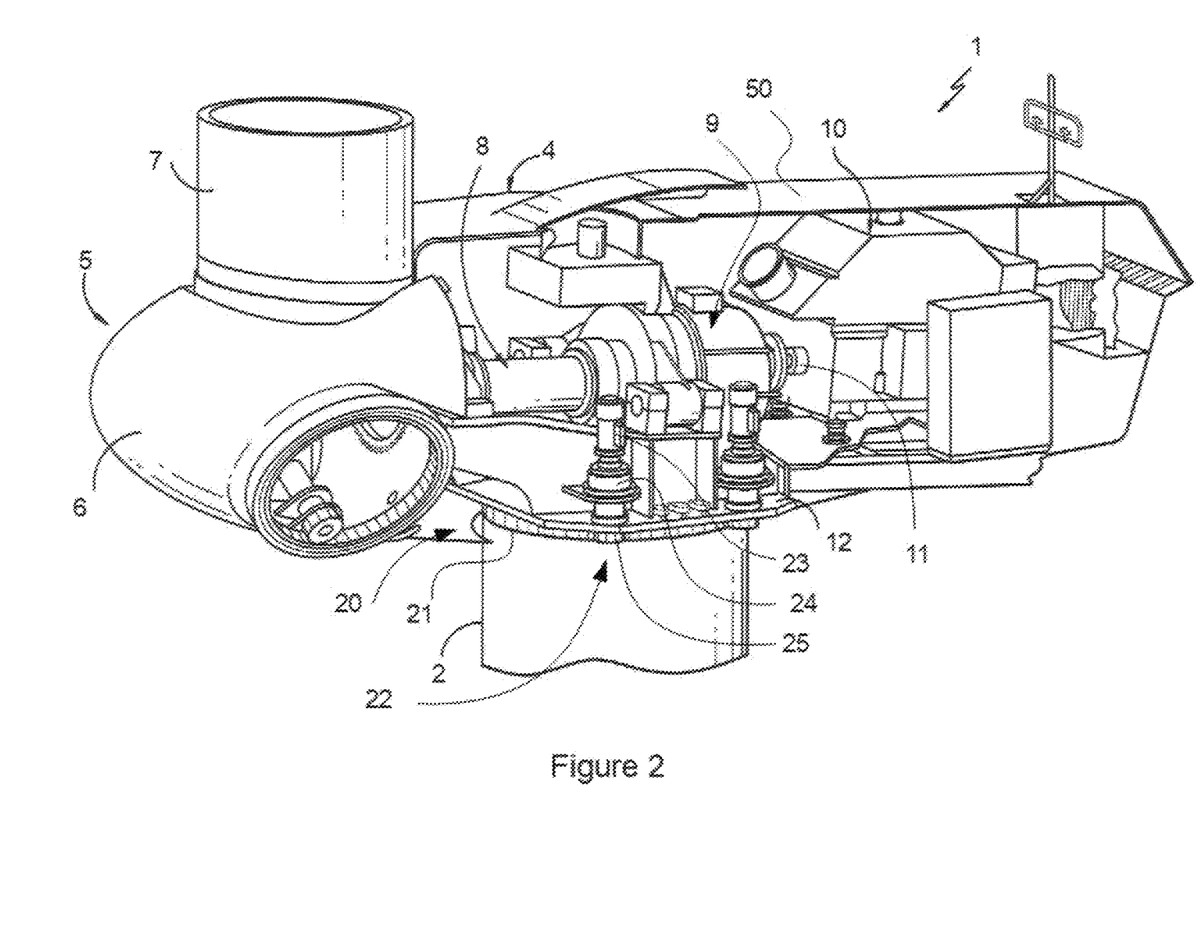
FIG. 2 illustrates a simplified, internal view of a nacelle of a wind turbine according to one example of the present disclosure.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 6 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9. In alternative examples, the hub may be directly coupled to a rotor of the generator and the rotation of the hub may thus drive the rotor of the generator.

The generator 10 may be electrically coupled to the converter. The wind turbine converter may adapt the output electrical power of the generator to the requirements of the electrical grid.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor 23, a gearbox 24 and a pinion 25 for meshing with the annular gear for rotating one of the bearing components with respect to the other.

The nacelle 4 further comprises a cover structure 50 to house wind turbine components. In this example, wind turbine components housed in the cover structure 50 or enclosed by the cover structure comprise the generator 10, the converter, the gearbox 9 and the shaft 8. In other examples, wind turbine components arranged within the nacelle may refer to the converter and the generator.

Figure 3:
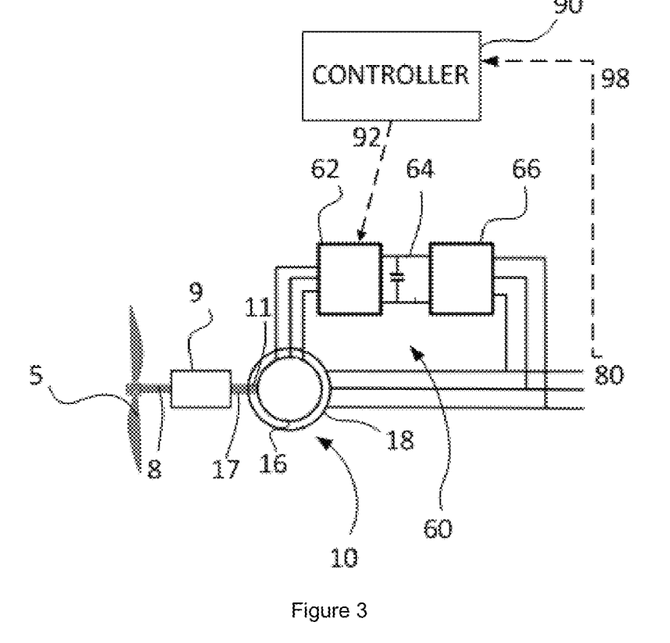
FIG. 3 schematically illustrates an example of a wind turbine.

FIG. 3 schematically illustrates a method of operating a wind turbine and a power converter in accordance with an example of the prior art. In the example of FIG. 3, a wind turbine comprises a generator 10, having a generator rotor 16 and a generator stator 18. The rotor 5 drives the low speeds shaft 8. The slow rotation of shaft 8 is converted into high speed rotation of the high speed shaft 17 by gearbox 9. The high speed shaft 17 may be connected to a shaft 11 of the generator rotor 16 through a flexible coupling.

The generator stator 18 is directly connected to an electrical grid 80 and will supply electrical power to the grid according to the grid frequency. A power converter 60 electrically connects windings on the generator rotor with the electrical grid 80. In this particular example, the rotor 16 of the generator 10 is connected to a machine-side converter 62. The machine side converter is connected to a line-side converter 66 through a DC link 64. The generator in this particular example is a Doubly Fed Induction Generator (DFIG). Within the scope of the present disclosure other generator topologies and converter configurations may be used.

In accordance with this example, the power converter 60 may receive a set-point 92 from a controller 90 of the wind turbine to adapt the generator torque. The set-point 92 may be based on an optimum operation of the wind turbine in accordance with prevailing meteorological conditions. By controlling the generator torque, a speed of rotation of the generator can be controlled. The speed of rotation of the generator in turn determines the speed of rotation of a wind turbine rotor 5. The speed of rotation may be chosen in accordance with a predefined operation schedule. In particular, it is known to control the wind turbine differently in different wind speed ranges. In wind speed ranges below a nominal wind speed, the speed of rotation may be chosen such that wind impinges on the blades of the rotor at an optimum angle of attack. This method of operating can be maintained until a maximum speed of rotation is achieved.

At higher wind speeds, and in particular above the nominal wind speed, the speed of rotation may be controlled to keep it constant. Maximum torque may be applied to the stator and the blades may be pitched to ensure a constant speed of rotation. Variations with respect to such an optimized operation are possible.

In accordance with the predefined operation, a torque signal 92 may be sent to the machine-side converter by a controller of the wind turbine. The resulting active power output from the stator 18 is fed to the grid. The controller 90 of the wind turbine may be a local wind turbine controller, or may be e.g. a controller for a wind farm.

A voltage event as described herein may be regarded as an event on the electrical grid during which voltage levels deviate from normal levels. A voltage sag is an example of such an event.

A voltage sag or voltage dip is a short duration reduction in voltage on the grid. The terms voltage sag and voltage dip are used throughout the present disclosure interchangeably. Voltage levels on the grid during such a voltage may drop more than 10% below its nominal value, and may reach e.g. 30%, 20% or 10% of its nominal value. Voltage levels may even reach zero during such a voltage sag. A voltage sag can last from less than 1 second up to a few seconds.

Nowadays many grid codes require the wind turbines connected to the grid to stay connected during such a voltage dip and to start generating power within a very short time frame, or immediately after the voltage dip has ended.

The controller 90 may determine various electrical parameters of the grid, including e.g. voltage, phase angle, and frequency. The controller 90 may measure these variables, or may receive the values of the parameters from e.g. higher level controller. For example, controller 90 may be the local wind turbine controller, and it may receive the values from a wind farm controller.

When the controller 90 determines the presence of a voltage dip, it can adjust the control signals 92 to the converter. Torque on the rotor may be reduced and as a result, the generator rotor speed may increase. The rotational speed of all drive train components can thus increase. Moreover, torsional oscillations may occur on all drive train components, and the generator.

Figure 4:
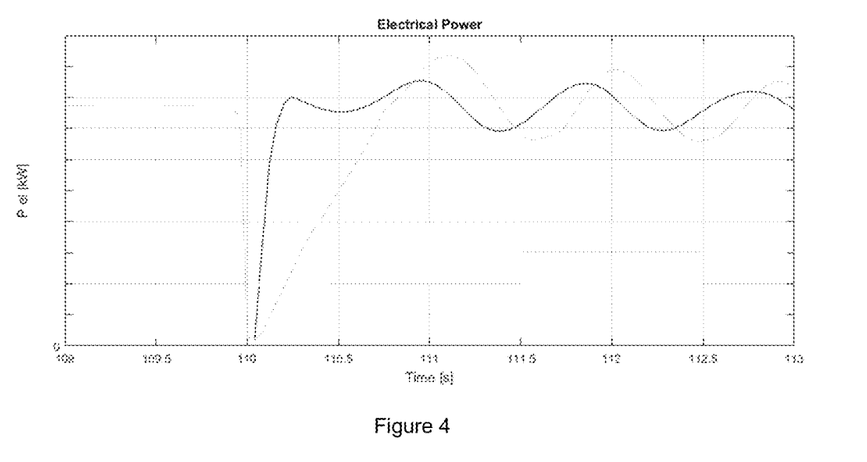
FIG. 4 schematically illustrates a method of power recovery after a voltage dip applying two different torque profiles.

The controller 90 may determine that the voltage dip on the grid has ended and send suitable control signals to increase the generator torque to increase power production. FIG. 4 schematically illustrates two different torque profiles. A torque profile may be understood as a function describing the generator torque as a function of time. In one case, the torque profile is steep, with a fast recovery rate. In the other case, the torque profile is less steep with a lower recovery rate.

It has been found that depending on the circumstances of the voltage sag and the characteristics of the wind turbine, providing a high torque rate can lead to high torsional loads that can damage the flexible coupling between the high speed shaft 17 and the shaft 11 of the generator rotor. Also, when applying a high torque rate, an instantaneous maximum generator speed and maximum electrical power may be high.

On the other hand, a slow recovery rate may not comply with the grid code, because recovery of power production might take too long.

Figure 5:
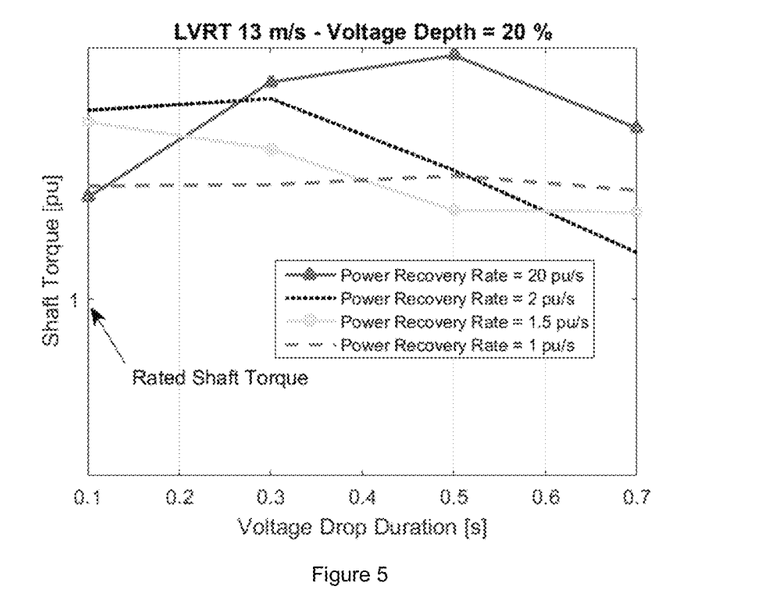
FIG. 5 schematically illustrates a maximum torque on a low speed shaft of a wind turbine when applying different torque profiles after a voltage sag as a function of the duration of the voltage sag.

FIG. 5 schematically illustrates the maximum torque on a low speed shaft of a wind turbine for four different torque profiles as a function of the duration of the voltage sag. Each of the torque profiles has a constant, but different torque rate. In all cases, a wind speed of 13 m/s is assumed and a voltage dip of 20% of the nominal value (i.e. the voltage level reached during the dip on the electrical grid is about 20% of its nominal value) is assumed.

Figure 6:
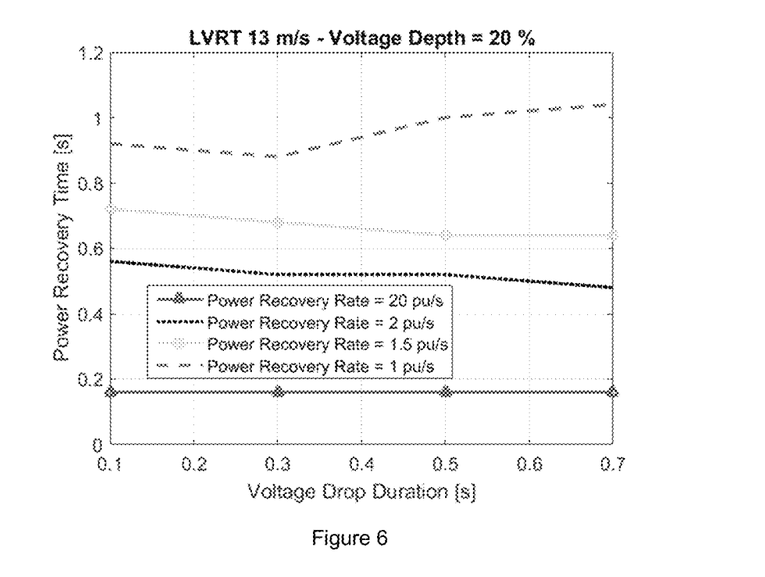
FIG. 6 schematically illustrates a time until power recovery after a voltage sag when applying different torque profiles as a function of the duration of the voltage sag.

FIG. 6 schematically illustrates the time until "normal" power output is recovered for the same four different torque profiles as a function of the duration of the voltage sag.

Paradoxically, depending on the characteristic of the voltage sag, it may be seen in FIG. 5 that the highest torque loads do not necessarily occur for the torque profiles having the highest torque rate. Also it may be seen in FIG. 6 that power recovery, for a given torque rate, may vary depending on the duration of the voltage sag.

The inventors have found that a suitable torque profile can be selected based on the acceleration of the generator rotor at the time the voltage sag has ended. In accordance herewith, a method of operating a wind turbine comprising a generator in the event of a voltage dip is provided. The method comprises detecting an end of the voltage dip, determining an acceleration of a rotor of the generator, and increasing a torque of the generator when the end of the voltage dip is detected according to a selected torque profile. The selected torque profile is selected from a plurality of predetermined torque profiles, wherein the predetermined torque profiles describe torque as a function of time. The selected torque may be selected based on the determined acceleration of the rotor of the generator.

The operational conditions when applying the torque are relevant for selecting the most suitable profile. Selecting the most suitable profile means that the recovery can be started immediately, or as soon as possible, after the voltage dip has ended. The torque may be increased immediately after recovery.

In some examples, the plurality of predetermined torque profiles comprises only two predetermined torque profiles. In other examples, three or more torque profiles may be used.

In some examples, the predetermined torque profiles comprise a first torque profile having a first torque recovery rate and a second torque profile having a second torque recovery rate, wherein the first torque recovery rate is higher than the second torque recovery rate.

In some examples, the first torque rate may be above 10 power units per second, and the second torque rate may be below 5 power units per second.

The term "power unit" refers to the amount of power that is to be recovered after a grid event and may thus be defined as the power produced before the grid event—power produced at the end of the grid event. The term "power unit per second" as used herein expresses the rate at which power is recovered and therefore indirectly indicates the torque rate. 1 power unit per second means that produced power would reach its level from before the grid event in one second.

In the examples of FIGS. 7-10, a first torque profile with a torque rate of 20 power units per second is provided. This means that a power level of before the voltage sag is reached within 0.05 seconds. A second torque profile with a torque rate of 1.5 power unit per second is provided.

In these examples, the first and the second torque recovery rates may be substantially constant until the power output of the generator reaches the first power level before the voltage dip occurred.

In some examples, the first torque profile may be selected when the acceleration of the rotor is above threshold value, and a second torque profile may be selected when the acceleration of the rotor is below the same threshold value. For example, the threshold value may be zero. When the acceleration of the rotor is positive, a first torque profile may be selected. A positive acceleration may be understood as an acceleration in the direction of rotation during normal operation. A negative acceleration may be understood as an acceleration in the opposite direction. The second torque profile may be selected when the acceleration of the rotor is negative.

It is noted that the threshold value for selecting the first or the second torque profile does not need to be zero, and might be set to be (slightly) positive or (slightly) negative.

Figure 7:
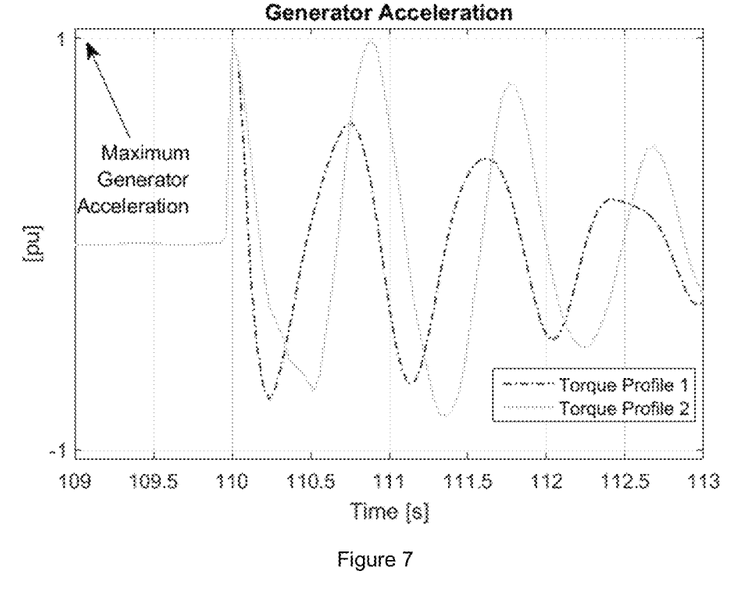
FIGS. 7 and 8 schematically illustrate acceleration of the generator rotor and torque loads on the low speed shaft during and after a voltage dip applying two different torque profiles.
Figure 8:
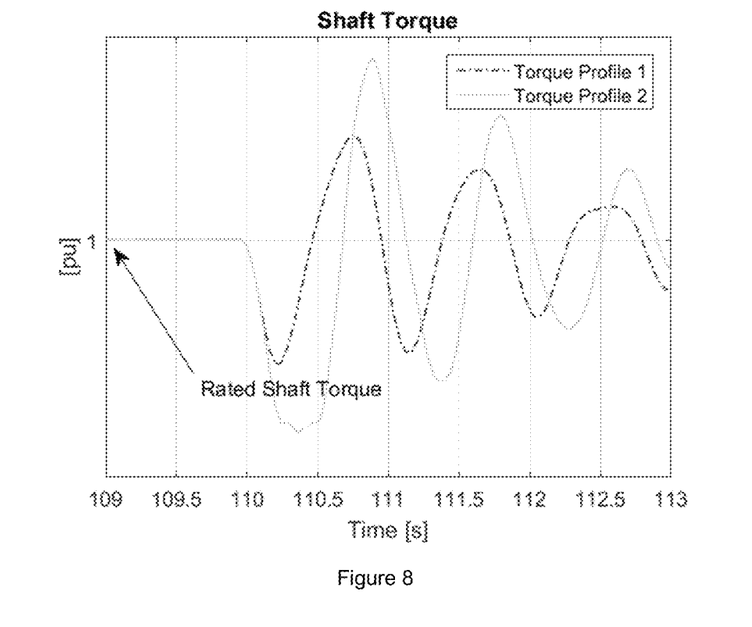

In FIGS. 7 and 8, the voltage sag is over when the acceleration is positive. Applying the first torque profile with the high torque rate leads to lower torque loads on the drive train than applying the second torque profile.

In some examples, determining the acceleration of the rotor of the generator of the wind turbine may comprise measuring the speed of rotation of the rotor. The acceleration of the rotor may be easily derived from the speed. The acceleration of the rotor can be relatively easily determined with sensors that are already standard on wind turbines. The acceleration of the generator is also a parameter that is reliable and effective. It does not depend on a theoretical behavior of a drive train.

The selected torque profile may be such that the resulting loads on a flexible coupling between a generator rotor shaft and a high speed shaft from the gearbox (in the case of such a wind turbine configuration, see FIG. 3) do not exceed a load threshold.

Figure 9:
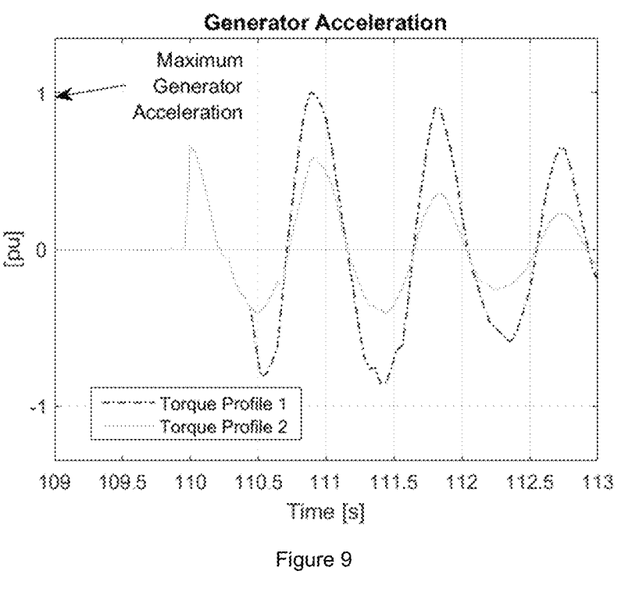
FIGS. 9 and 10 schematically illustrate acceleration of the generator rotor and torque loads on the low speed shaft during and after a voltage dip applying two different torque profiles.
Figure 10:
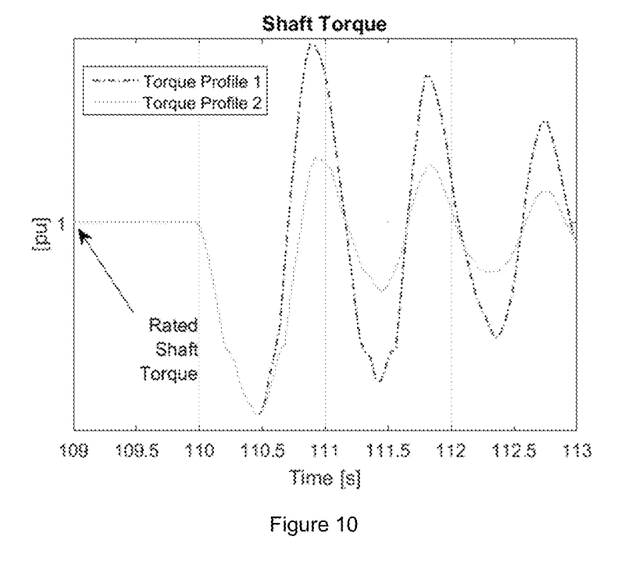

In FIGS. 9 and 10, it may be seen that when the acceleration is negative, the torque profile leading to lower torque loads in the drive train is the second torque profile with a lower torque rate. By selecting this profile in these circumstances, loads can once again be controlled and rotor speed can be kept below dangerous levels as well.

The suitable torque profile for these circumstances can be applied immediately after the voltage dip has ended.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of operating a wind turbine comprising a generator in the event of a voltage dip, the method comprising:
    detecting an end of the voltage dip;
    determining an acceleration of a rotor of the generator,
    increasing a torque of the generator when the end of the voltage dip is detected according to a selected torque profile;
    wherein the selected torque profile is selected from a plurality of predetermined torque profiles, wherein the predetermined torque profiles describe torque as a function of time; and
    wherein the selected torque profile is selected based on the determined acceleration of the rotor of the generator.

2. The method according to claim 1, wherein the plurality of predetermined torque profiles comprises only two predetermined torque profiles.

3. The method according to claim 1, wherein the predetermined torque profiles comprise a first torque profile having a first torque recovery rate and a second torque profile having a second torque recovery rate, wherein the first torque recovery rate is higher than the second torque recovery rate.

4. The method according to claim 3, wherein the first torque profile is selected when the acceleration of the rotor of the generator is above a threshold value for the acceleration.

5. The method according to claim 4, wherein the second torque profile is selected when the acceleration of the rotor of the generator is below the threshold value for the acceleration.

6. The method according to claim 5, wherein the threshold value is zero.

7. The method according to claim 3, wherein the generator has a first power output level when the voltage dip occurs, and wherein the first and the second torque recovery rates are substantially constant until the power output of the generator reaches the first power level.

8. The method according to claim 1, wherein determining the acceleration of the rotor of the generator of the wind turbine comprises measuring the speed of rotation of the rotor.

9. A wind turbine comprising:
    a wind turbine rotor with a plurality of blades;
    a generator including a generator rotor and a generator stator, wherein the generator rotor is operatively coupled to the wind turbine rotor;
    a controller for controlling a torque of the generator, wherein the controller is further configured to:
        determine an end of a voltage dip on a grid connected to the generator;

determine an acceleration of the generator rotor at the end of the voltage dip;

apply a torque to the generator at the end of the voltage dip according to a predetermined torque profile selected from a plurality of torque profiles, wherein the predetermined torque profile describes torque as a function of time; and wherein the predetermined torque profile is selected based on the determined acceleration of the generator rotor at the end of the voltage dip.

10. The wind turbine according to claim 9, further comprising a gearbox operatively connecting a low speed shaft to a high speed shaft, wherein the high speed shaft is connected to a shaft of the generator rotor through a flexible coupling.

11. The wind turbine according to claim 10, wherein the plurality of torque profiles are such that loads on the flexible coupling do not exceed a threshold load.

12. The wind turbine according to claim 9, further comprising a power converter configured to apply a torque to the generator based on signals received from the controller.

13. The wind turbine according to claim 9, wherein the predetermined torque profiles comprise a first torque profile having a first torque recovery rate and a second torque profile having a second torque recovery rate, wherein the first torque recovery rate is higher than the second torque recovery rate.

14. The wind turbine according to claim 13, wherein the controller is configured to select the first torque profile when the acceleration of the generator rotor is positive and to select the second torque profile when the acceleration of the generator rotor is negative.

15. The wind turbine according to claim 13, wherein the generator has a first power output level when the voltage dip occurs, and wherein the first and the second torque recovery rates are substantially constant until the power output of the generator reaches the first power level.

16. A method of operating a wind turbine including a generator connected to an electrical grid, comprising:

determining a voltage event on the electrical grid;

reducing a torque of the generator during the voltage event;

determining a recovery of the electrical grid after the voltage event;

determining an acceleration of a rotor of the generator at a moment of recovery;

increasing the torque of the generator substantially to a level prior to the voltage event;

wherein the torque is increased with a first substantially constant torque rate or with a second substantially constant torque rate; and wherein the first or the second torque rate is selected based on the acceleration of the rotor of the generator at the moment of recovery.

17. The method according to claim 16, wherein the torque is increased immediately after recovery.

18. The method according to claim 17, wherein the first torque rate is higher than the second torque rate, and wherein the first torque rate is selected in case of a positive acceleration of the rotor of the generator at the moment of recovery.

19. The method according to claim 18, wherein the second torque rate is selected in case of a negative acceleration of the rotor of the generator at the moment of recovery.

20. The method according to claim 17, wherein the first torque rate is above 10 power units per second, and the second torque rate is below 5 power units per second.

* * * * *